United States Patent
Christensen et al.

(10) Patent No.: US 7,761,484 B2
(45) Date of Patent: Jul. 20, 2010

(54) COMPLETE MAPPING BETWEEN THE XML INFOSET AND DYNAMIC LANGUAGE DATA EXPRESSIONS

(75) Inventors: Erik B. Christensen, Seattle, WA (US); Stephen J. Maine, Seattle, WA (US); Natasha Jethanandani, Seattle, WA (US); Krishnan Rangachari, Kirkland, WA (US); Sowmyanarayanan K. Srinivasan, Redmond, WA (US); Eugene Osovetsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 225 days.

(21) Appl. No.: 11/673,349

(22) Filed: Feb. 9, 2007

(65) Prior Publication Data

US 2008/0195634 A1     Aug. 14, 2008

(51) Int. Cl.
*G06F 17/30* (2006.01)
(52) U.S. Cl. .................. 707/807; 707/602; 707/811; 715/234
(58) Field of Classification Search ............... None
See application file for complete search history.

(56) References Cited

U.S. PATENT DOCUMENTS

| | | | |
|---|---|---|---|
| 6,163,776 A | 12/2000 | Periwal | |
| 6,427,228 B1 | 7/2002 | Wigger | |
| 6,578,192 B1 | 6/2003 | Boehme et al. | |
| 6,732,330 B1 * | 5/2004 | Claussen et al. | 715/234 |
| 6,754,884 B1 | 6/2004 | Lucas et al. | |
| 6,999,956 B2 | 2/2006 | Mullins | |
| 7,426,721 B1 * | 9/2008 | Saulpaugh et al. | 717/144 |
| 2002/0087630 A1 * | 7/2002 | Wu | 709/203 |
| 2002/0169842 A1 * | 11/2002 | Christensen et al. | 709/206 |
| 2002/0178290 A1 * | 11/2002 | Coulthard et al. | 709/246 |
| 2003/0018661 A1 * | 1/2003 | Darugar | 707/500 |
| 2003/0110446 A1 * | 6/2003 | Nemer | 715/513 |
| 2004/0015840 A1 * | 1/2004 | Walker | 717/108 |
| 2004/0025141 A1 | 2/2004 | Nanda et al. | |
| 2004/0044987 A1 * | 3/2004 | Kompalli et al. | 717/100 |
| 2004/0143823 A1 * | 7/2004 | Wei | 717/140 |
| 2004/0148588 A1 * | 7/2004 | Sadiq | 717/109 |
| 2004/0210599 A1 | 10/2004 | Friedman et al. | |
| 2005/0097504 A1 * | 5/2005 | Ballinger et al. | 717/100 |
| 2005/0154978 A1 * | 7/2005 | Albornoz et al. | 715/513 |

(Continued)

FOREIGN PATENT DOCUMENTS

WO     WO 2005/074490     *  8/2005

OTHER PUBLICATIONS

Stefan Goessner, "Converting Between XML and JSON", http://www.xml.com/lpt/a1658, May 31, 2006.*

(Continued)

*Primary Examiner*—Apu M Mofiz
*Assistant Examiner*—Hung D Le
(74) *Attorney, Agent, or Firm*—Workman Nydegger

(57) ABSTRACT

Converting data to an appropriate format for use with a service. An example method is illustrated where a message including data expressed using dynamic language data expressions is received. The dynamic language data expressions include a tree structure organization for the data. The data expressed using dynamic language data expressions is expressed in an XML data structure. The XML data structure preserves the original tree structure organization for the data.

15 Claims, 2 Drawing Sheets

U.S. PATENT DOCUMENTS

| | | | |
|---|---|---|---|
| 2005/0155027 A1* | 7/2005 | Wei | 717/162 |
| 2005/0187908 A1 | 8/2005 | Madan et al. | |
| 2005/0198100 A1 | 9/2005 | Goring et al. | |
| 2006/0047780 A1* | 3/2006 | Patnude | 709/219 |
| 2006/0106945 A1* | 5/2006 | Westervelt et al. | 709/246 |
| 2006/0107201 A1* | 5/2006 | Chien-Fa et al. | 715/513 |
| 2006/0179054 A1* | 8/2006 | Levi | 707/6 |
| 2006/0235882 A1* | 10/2006 | Mateescu et al. | 707/104.1 |
| 2007/0186156 A1* | 8/2007 | Bagare et al. | 715/523 |
| 2007/0220065 A1* | 9/2007 | Coyle et al. | 707/203 |
| 2008/0010629 A1* | 1/2008 | Berg et al. | 717/116 |
| 2008/0017722 A1* | 1/2008 | Snyder et al. | 235/494 |

OTHER PUBLICATIONS

James Newton-King, "Json.NET 1.1 released", http//james,newtonking.com/archive/2006/07/11/656.aspx, 2006.*

Stefan Goesner, "Converting Between XML and JSON @ XML.com", http//goesner.net/2006/06/converting-between-xml-and-json-xmlcom.html, 2006.*

ASP. Net Forums, "Converting JSON to XML", http://forums.asp.net/p/1064842/1538141.aspx, Jan. 2007.*

"BadgerFish", http://badgerfish.ning.com.

"Jettison", http://jettison.codehaus.org/User%27s+Guide.

"Apache CXF: An Open Source Service Framework", http://cwiki.apache.org/CXF/.

"Introducing JSON", http://www.json.org.

* cited by examiner

COMPLETE MAPPING BETWEEN THE XML INFOSET AND DYNAMIC LANGUAGE DATA EXPRESSIONS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

To communicate with one another, computers use various protocols and message formats. A computer system is only able to interpret messages in formats for which the computer system includes an appropriate serialization stack used to convert the message to usable application data or objects. As such, computing systems may include application programming interfaces (APIs) which developers use to program the computer system to incorporate certain functionality, while allowing appropriate message formats to be implemented for inter-computer system communication.

As might be imagined, all message formats are not compatible with one another. For example, Web Services is a standardized way of integrating applications. Standardized XML documents can be used with SOAP (Simple Object Access Protocol) messages and WSDL (Web Services Description Language) descriptions to integrate applications without an extensive knowledge of the applications being integrated. Alternatively, dynamic language expressions, such as JavaScript Object Notation (JSON) may be used as a format for sending messages. Each of these formats is interpreted by different un-compatible serialization stacks. Some of the difficulty in interchanging XML and dynamic language expressions arises from different format requirements. For example, XML messages are ordered, whereas dynamic languages expressions are typically unordered. XML messages always include a root name, whereas many dynamic language expressions do not include a root name. XML element contents do not have type assignments, whereas contents of dynamic language expression elements often have type assignments.

The subject matter claimed herein is not limited to embodiments that solve any disadvantages or that operate only in environments such as those described above. Rather, this background is only provided to illustrate one example of a technology area where some embodiments described herein may be practiced.

BRIEF SUMMARY

In one example embodiment, a method is illustrated where a message including data expressed using dynamic language data expressions is received. The dynamic language data expressions include an organization for the data. The data expressed using dynamic language data expressions is expressed in an XML data structure. The XML data structure preserves the original organization for the data.

Similarly, other embodiments may include mapping from XML data structures to dynamic language data expressions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments disclosed herein are directed to mapping XML messages to and from dynamic language data expressions. The embodiments of the present invention may comprise a special purpose or general-purpose computer including various computer hardware, as discussed in greater detail below.

Web Services is a standardized way of integrating applications. Standardized XML documents can be used with SOAP (Simple Object Access Protocol) messages and WSDL (Web Services Description Language) descriptions to integrate applications without an extensive knowledge of the applications being integrated. Similarly, dynamic language data expressions, such as JavaScript Object Notation (JSON) are data-interchange formats defining data in a tree structure particular to the particular data-interchange format.

Some embodiments described herein facilitate mapping between XML and dynamic language data expressions. Additionally, some embodiments facilitate using serialization stacks intended for use with XML messages with dynamic language data expressions expressed as XML messages. Further still, some embodiments facilitate the use of specialized serialization stacks which can interpret both XML messages and dynamic language data expressions packaged in an XML envelope without the dynamic language data expressions being mapped directly to an XML message. Even further still, some embodiments facilitate the use of specialized serialization stacks which can interpret specialized XML messages which include information particular to dynamic language data expressions when a dynamic language data expression is translated to one of the specialized XML messages.

Various advantages can be realized in different embodiments by mapping from one expression format to another. For example, in some embodiments, by mapping dynamic language data expressions to XML messages, standard XML data handing features and filters can be used for the data. Additionally, in some embodiments, infrastructure requirements and updating can be minimized. Further, greater interoperability between systems can be realized.

Figure 1:
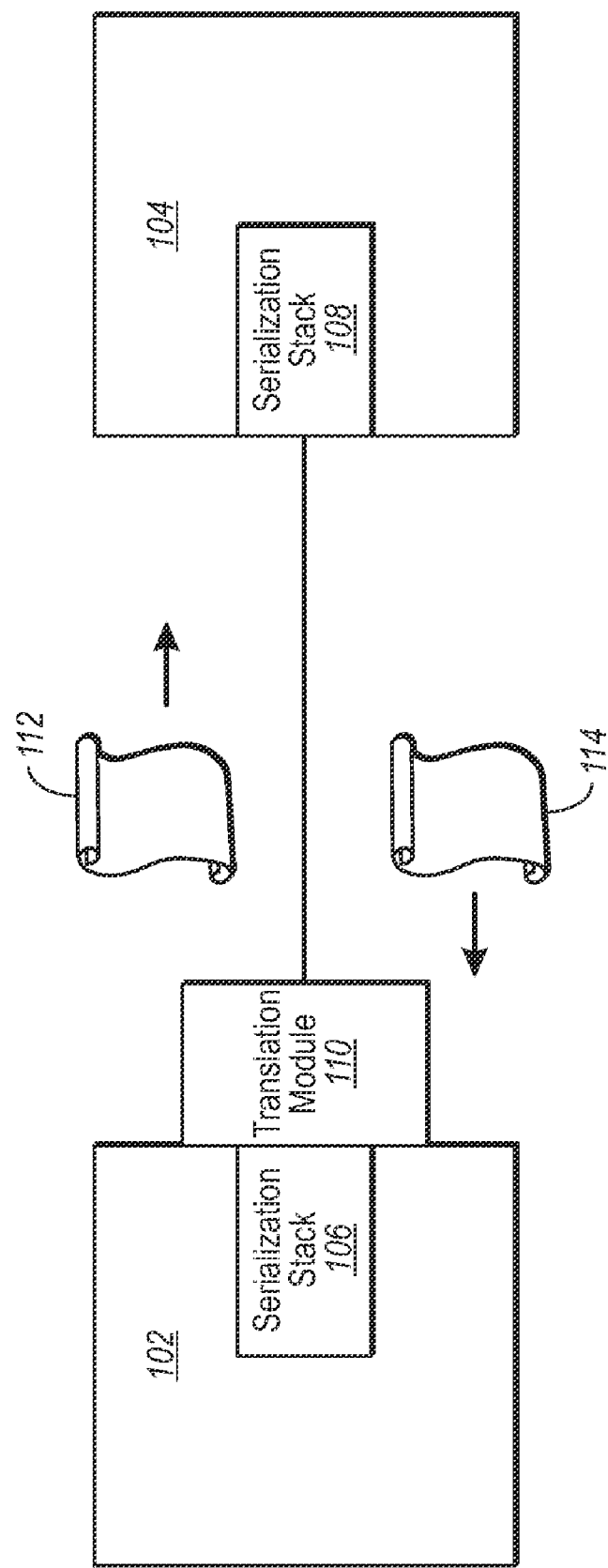
FIG. 1 illustrates an environment including computing systems using XML and/or dynamic language data expression serialization stacks.

Referring now to FIG. 1, an exemplary environment is illustrated. In the exemplary environment 100, a first entity 102 is configured to communicate with a second entity 104. The entities in this example may be any one of the number of different computer structures including standalone computer systems, services on a computer system, applications, network devices, or any other appropriate computing device. As illustrated in FIG. 1, the first entity 102 includes a serialization stack 106. Similarly, the second entity 104 also includes a serialization stack 108.

The serialization stacks 106 and 108 may be designed for different data formats. For example, the serialization stack 106 may include a serializer designed to serialize and deserialize XML data. An XML serialization stack produces an XML Infoset that is written to a component called an "XML writer." An XML serialization stack expects to read an XML infoset from a component called an "XML reader". In contrast, the serialization stack 108 may include a serializer configured to serialize and deserialize dynamic language data expressions. To allow the first entity 102 and second entity 104 to communicate, the first entity 102 and second entity 104 may be implemented in a framework which allows for the translation of one data format to another data format.

Illustratively, FIG. 1 illustrates a translation module 110 which in this embodiment is implemented at a data entry and exit point of the first entity 102. Notably, the translation module 110 may be implemented at other locations within a framework. In one embodiment, the translation module 110 may be configured to translate the XML infoset to a dynamic language format that is compatible with the serialization stack 108. A dynamic language message may be sent as illustrated at 112, where the message includes data translated from an XML expression, or received as illustrated at 114. In one embodiment, the serialization stack 106 may be an un-modified serialization stack used for XML Infoset standard XML only communications. In this embodiment, the translation from the dynamic language data expressions to an XML format may result in the loss of some information. For example, the typical dynamic language data expression may include type information for data included in the dynamic language data expression. The type information identifies the data, for example, as one of an integer, a floating point number, an array, a string, etc. However, standardized XML serialization stacks such as those complying with standards such as the standard for XML Infosets published by W3C do not include the ability to interpret type information. Thus, in one embodiment, the type information may be excluded when the dynamic language data expression is translated to an XML format.

In another example, the JSON format is unordered, while XML is ordered. In one embodiment, this can be overcome by introducing a special deserializer mode in which the serializer ignores order.

By removing the information that is not compatible with the existing serialization stack 106, the serialization stack 106 does not need to be modified to handle data from the second entity 104. While this embodiment is useful for certain applications, it may not be appropriate for other applications. For example, it may not be possible for data to make a round trip. That is, if information is removed from the data in an incoming message 114 such that the data is no longer compatible with the serialization stack 108 at the second entity 104, it may not be possible to return the translated data back to the first entity 102 in a reply message 112. In other words, while mapping from am XML data structure to a dynamic language data expression or mapping from a dynamic language data expression to an XML data structure may be performed, some embodiments may not allow mapping from XML data structures to dynamic language data expressions and back to XML data structures or from dynamic language data expressions to XML data structures and back to dynamic language data expressions.

Other embodiments may be implemented which allow for data to make a round trip. In one such embodiment, the serialization stack 106 may be modified to, or a new serialization stack can be designed to handle information ordinarily included in dynamic language data expressions and not included in XML expressions form messages. In one such embodiment, the translation module 110 may simply package a dynamic language data expression received in message 114 in an XML envelope. The serialization stack 106 at the first entity 102 may include functionality for stripping the dynamic language data expressions from the XML envelope and for deserializing the dynamic language data expressions. In this embodiment, all type information is maintained and may be used for return messages 112. Similarly, a serialization stack may be designed to handle XML messages packaged into dynamic language data expression envelopes.

In an alternative embodiment, the serialization stack 106 may include functionality for interpreting a nonstandard XML format message. Illustratively, in one embodiment, a message 114 containing a dynamic language data expression may be sent from the first entity 102. The translation module 110 may express the data in the dynamic language data expression in a modified XML format, where the modified XML format includes information such as type information not ordinarily included in some standardized XML format messages.

For example, the following is a representation of a dynamic language data expression with inherently included type information.

[1, 2, 3, {"x": 1, "y": "2"}]

The dynamic language data expression may be translated into a modified XML format message expressed in part as follows:

```
<root type="array">
<item type="number">1</item>
<item type="number">2</item>
<item type="number">3</item>
<item type="object">
<x type="number">1</x>
<y type="string">2</y>
</item>
</root>
```

The serialization stack 106 may be configured to handle the additional type information that is included in the XML format message. Similarly, a serialization stack may be configured to handle non-standard dynamic language data expressions such that the information normally included in an XML data structure, but not included in a standard dynamic language data expression can be handled when included in a non-standard dynamic language data expression that is processed by the serialization stack.

In yet another similar embodiment, XML schemas may be used to identify where certain types of information should be included. XML schemas define a set of rules to which an XML document should conform. Thus, an XML schema may define a particular location in the document for particular data types. As such, data type information may be included implicitly as a result of the data being expressed in a particular portion of the XML format document. One variant of such an embodiment would use XML element names instead of XML attributes to convey type information to facilitate schema creation and processing, for example:

```
<root><array>
<item><number>1</number></item>
<item><number>2</number></item>
<item><number>3</number></item>
<item><object>
<x><number>1</number></x>
<y><string>2</string></y>
</object></item>
</array></root>
```

Notably, other embodiments may also be implemented to facilitate allowing data to make a round trip including mapping from XML to dynamic language data expressions and back to XML or from dynamic language data expressions to XML and back to dynamic language data expressions. For example, in one embodiment, some element names may be missing in dynamic language data expressions, but are present in XML. In one embodiment, instead of an XML serializer asking for an element name, it may ask the XML reader a Yes/No question. The dynamic language expression reader answers can then answer in the affirmative whenever the name is missing from the dynamic language expression, thus avoiding the need for the reader to know the name that the serializer expects.

Further in some embodiments, out of band data paths can be used to communicate information used in one data format, but not compatible with a different data format. Illustratively, the JSON format treats arrays in a special way, while in XML there is no special way to denote arrays. This mismatch can be overcome if the serializer makes available special out-of-band information to the XML writer when it starts and finishes writing out an array.

In yet another example, the JSON format is unordered, while XML is ordered. In one embodiment, this can be overcome by the deserializer passing out-of-band information to a JSON XML reader as to what order is expected. The reader will then expose XML from JSON in the desired order. In one embodiment, the reader and writer set forth above may be implemented in the translation module 110 illustrated in FIG. 1.

Figure 2:
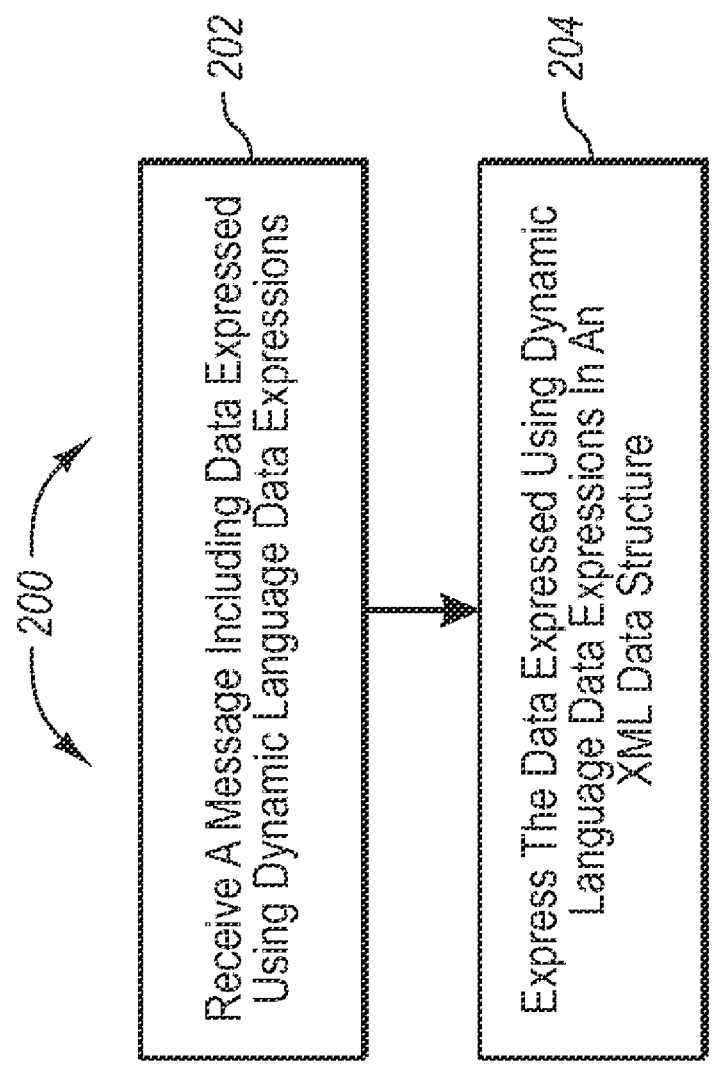
FIG. 2 illustrates a method translating dynamic language data expressions to XML messages.

Referring now to FIG. 2, a method 200 is illustrated. The method 200 may be practiced, for example, in a computing environment. The method includes acts for converting data to an appropriate format for use with a service. While the method illustrates converting from dynamic language data expressions to XML data structures, similar principles may be implemented to convert from XML data structures to dynamic language data expressions. The method includes receiving a message including data expressed using dynamic language data expressions (act 202). The dynamic language data expressions include a tree structure organization for the data. In one embodiment, the dynamic language data expressions may be JSON messages.

The method 200 further includes an act of expressing the data expressed using dynamic language data expressions in an XML data structure (204). The XML data structure preserves the original tree structure organization for the data.

In one embodiment, expressing the data expressed using dynamic language data expressions in an XML data structure, may be performed in a dynamic streaming fashion. Illustratively, embodiments may be implemented where the mapping from one language to another is performed dynamically without the need to store an entire mapped message. Rather, the message can be mapped dynamically, and transmitted to another entity as the mapping occurs. This embodiment may be implemented to preserve memory resources.

The method 200 may further by performed such that the XML data structure preserves type information from the data expressed using dynamic language data expressions. The type information includes information defining data expressed using dynamic language data expressions as, for example, an integer, a floating point number, a string, or an array. As described previously, the type information may be preserved in a number of different fashions. For example, in one embodiment, the XML data structure preserves type information from the data expressed using dynamic language data expressions by including the type information as an XML element (or tag) related to an XML element expressing the data expressed using dynamic language data expressions. For example, as illustrated above, the XML tags may include information defining data types for data expressed as XML elements.

In an alternative embodiment, the XML data structure preserves type information from the data expressed using dynamic language data expressions by expressing the dynamic language data expressions according to an XML schema. The XML schema defines locations where specific types are to be expressed.

The method 200 may further include processing the XML data structure using a common serializer, where the common serializer is an unmodified serialzier used for processing messages received in XML data structures. In other words, an XML serialization stack without inherent dynamic language data expression support may be used to deserialize the data expressed using dynamic language data expressions expressed in an XML data structure. This may be performed, for example, when expressing the data expressed using dynamic language data expressions in an XML data structure (act 204) is performed such that an XML message compliant with the formats usable by the unmodified serializer is created.

In other embodiments, the method 200 may include processing the XML data structure using a common serializer, where the common serializer is a modified serialzier used for processing both messages received in XML data structures and data from messages received including data expressed using dynamic language data expressions once the data is expressed in an XML data structure. For example, the serializer may include functionality for processing non-standard XML data structures which include information not typical in XML data structures, but which are typical in dynamic language data expressions. For example, the common serializer may include functionality for processing type information included in a non-standard XML data structure.

In the method 200 described above, the XML data structure may take various forms. For example, in one embodiment, the XML data structure may be part of a SOAP message. As noted, the XML message may be an XML Infoset message complying with requirements for XML Infoset messages such as those included in the W3C specification for XML Infoset messages. As noted, alternative embodiments may use XML messages that are not compliant with usual XML messages used in a SOAP serialization stack such as when a new or modified serialization stack is used which is able to handle additional information in the non-compliant XML messages.

The method 200 may further include functionality to allow for round-trip paths of data. For example, the method 200 may further include expressing data expressed in an XML data structure in dynamic language data expressions and sending the data from the XML data structure expressed in dynamic language data expressions to a system that processes dynamic language data expressions. For example, FIG. 1 illustrates where a message 112 may be sent to the second entity 104, which includes a serialization stack 108 configured to handle dynamic language data expressions.

As noted in other examples herein, expressing the data expressed using dynamic language data expressions in an XML data structure may include excluding dynamic language data expression information that is not compatible with a serializer used for the XML data.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise computer storage media and communication media. Computer storage media comprises RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a communication medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer having a processor and memory and further including an extensible markup language (XML) serialization stack, a method performed by the computer to convert data expressed using JavaScript Object Notation (JSON) into an XML data structure for use with a service, the method comprising:

receiving, at a translation module of the computer, a message including data expressed using JSON, the data expressed using JSON including type information; and the translation module expressing the data expressed using JSON in an XML data structure, wherein the XML data structure preserves the original organization for the data by preserving the type information from the data expressed using JSON by naming one or more elements of the XML data structure with the name of the type of data that is enclosed by the corresponding element, wherein the type information includes at least one of an object, a number, a string, or an array.

2. The method of claim 1, wherein the XML data structure comprises a Simple Object Access Protocol (SOAP) message.

3. The method of claim 1, further comprising processing the XML data structure using a common serializer, wherein the common serializer is an un-modified serializer used for processing messages received in XML data structures.

4. The method of claim 1, further comprising processing the XML data structure using a common serializer, wherein the common serializer is a serializer used for processing both messages received in XML data structures and data from received JSON messages once the data is expressed in an XML data structure.

5. The method of claim 1, further comprising:

expressing data expressed in an XML data structure in JSON; and sending the data from the XML data structure expressed in JSON to a system that processes JSON.

6. The method of claim 5, further comprising asking a yes/no question to determine an element name not included in the data expressed using JSON, but included in the XML data structure.

7. The method of claim 1, wherein expressing the data expressed using JSON in an XML data structure comprises excluding JSON information that is not compatible with a serializer used for the XML data.

8. The method of claim 1, wherein expressing the data expressed using JSON in an XML data structure, is performed in a dynamic streaming fashion.

9. The method of claim 1, further comprising receiving out of band data communicating information used in JSON, but not compatible with the XML data structure.

10. In a computer having a processor and memory and further including an extensible markup language (XML) serialization stack, a method performed by the computer to convert data expressed using JavaScript Object Notation (JSON) into an XML data structure for use with a service, the method comprising:

receiving a message including data expressed using JSON, wherein the JSON message includes a tree structure organization for the data; and expressing the data expressed using JSON in an XML data structure, wherein the XML data structure preserves the original tree structure organization for the data by preserving type information from the data expressed using JSON by naming one or more elements of the XML data structure with the name of the type of data that is enclosed by the corresponding element, wherein the type information includes at least one of an object, a number, a string, or an array.

11. The method of claim 10, wherein the XML data structure comprises a SOAP message.

12. The method of claim 10, further comprising processing the XML data structure using a common serializer, wherein the common serializer is a serializer used for processing both messages received in XML data structures and data from received JSON messages once the data is expressed in an XML data structure.

13. The method of claim 10, wherein expressing the data expressed using JSON in an XML data structure comprises excluding JSON information that is not compatible with a serializer used for the XML data.

14. The method of claim 10, wherein expressing the data expressed using JSON in an XML data structure is performed in a dynamic streaming fashion.

15. A computer storage medium comprising computer executable instructions for performing the following acts:
   receiving a message including data expressed using JSON, wherein the JSON message includes a tree structure organization for the data; and
   expressing the data expressed using JSON in an XML data structure, wherein the XML data structure preserves the original tree structure organization for the data by preserving type information from the data expressed using JSON by creating an element in the XML data structure for each of the items of data expressed using JSON that includes type information, and defining the type information of the corresponding item of data within an attribute of the corresponding element, wherein the type information includes at least one of an object, a number, a string, or an array.

* * * * *